Patented Oct. 26, 1937

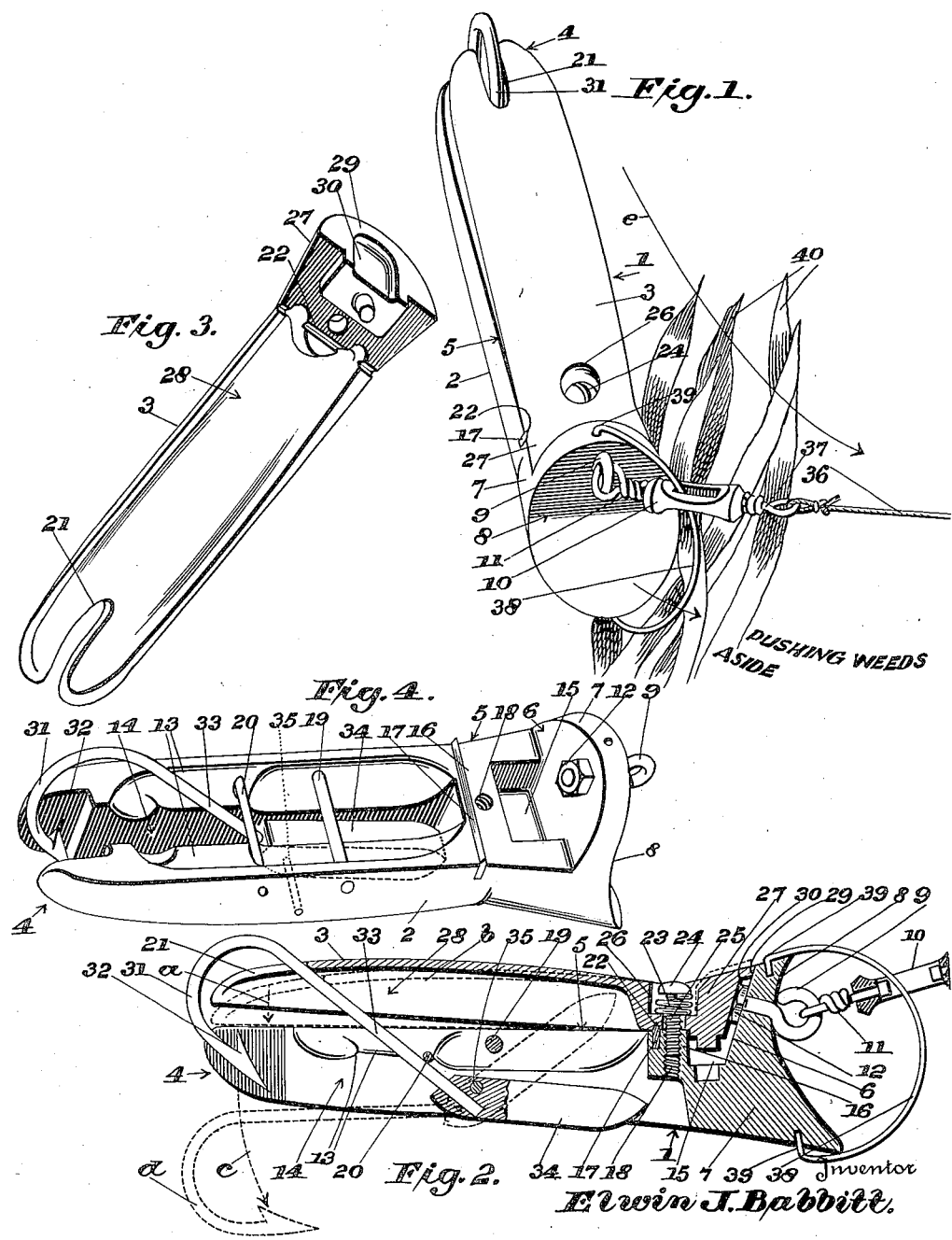

2,097,221

UNITED STATES PATENT OFFICE 2,097,221

LURE

Elwin J. Babbitt, Los Angeles, Calif., assignor of forty-five per cent to John L. Barneson, Los Angeles, Calif.

Application May 15, 1936, Serial No. 79,977

10 Claims. (Cl. 43—35)

This invention relates to improvements in artificial fish bait or lures for use in casting, trolling or still fishing, and its objects are as follows:

First, to provide a fish lure which has an overbalanced hook that tends to remain sheathed in the body of the lure, but which is automatically swung out when the lure is grasped by a fish and which will automatically return into the body when the lure is released.

Second, to provide a fish lure in which the pivoted hook is counter-weighted so as to tend to make it swing into the sheathed position, said counter-weight avoiding the need of any latch device or its equivalent for so holding the hook in place, also dispensing with the trouble of setting the hook preparatory to fishing.

Third, to provide a novel hook construction wherein a solid bronze or other counter-weight is molded onto the hook shank, said counter-weight providing a pivot mount and insuring that the lure will float right side up.

Fourth, to provide a nose guard which works in conjunction with the swivel in such a way that as the swivel is moved to one side or the other by the pull on the line, the guard swings accordingly and thereby parts a way through weeds and kelp and thus makes the lure weedless.

Other objects and advantages will appear in the following specification, reference being had to the accompanying drawing, in which:

Figure 1 is a perspective view of the improved fish lure, particularly illustrating how the nose guard pushes weeds aside.

Figure 2 is a central longitudinal section of the fish lure.

Figure 3 is a detail perspective view of the jaw.

Figure 4 is a detail perspective view of the jaw from which the foregoing jaw has been removed.

The instant fish lure is an improvement on the fish lures patented by Elwin J. Babbitt on Jan. 15, 1926, No. 1,588,690 and May 13, 1930, No. 1,758,817. The improvement, briefly summarized, comprises an automatic, self-setting hook which, because of its being counter-weighted, tends to maintain itself in a sheathed position within the lure, the pivot pin which acts as an axle, going through the counter-weight and into the body of the lure. One of the outstanding purposes is this, that when a fish strikes the bait or lure and by chance is not caught, the hook automatically resets itself in readiness for the next strike. On the other hand, if the fish does grasp the bait the hook is driven outwardly so that the fish is caught.

Reference is made to the drawing. The lure, generally designated 1, comprises the body 2 and a relatively movable jaw 3. The body is tapered toward the rear end 4 and is cut away on top as at 5. The cut-away ends in a wall surface 6, the upper portion of which serves as an abutment for the jaw 3 when the latter is in the open position (Fig. 2). The wall surface occurs on the left side of the enlarged head 7 at the forward end of the body, said head being concaved at 8 to provide adequate room for the eye bolt 9 and the swivel 10 which is attached to it at 11. The shank of the eye bolt goes through the head and is secured by a nut 12 against the wall surface 6.

In the interest of lightness the body 2 is carved away at 13 on each side of a center hook channel 14. For the same purpose the body 2 is additionally cut out at 15, but in making this cut out a bridge piece 16 is left in, this constituting the foundation for a knife edge 17 which is appropriately set in so as to permanently stay in place. The knife edge projects above the surface of the cut away 5 and extends from side to side of the body as shown. There is a threaded screw hole 18 in the bridge piece 16 immediately in front of the knife edge 17.

A spanner 19 extending from side to side of the body prevents the members set apart by the center channel 14 from spreading. Another spanner 20, more in the form of a light pin, also has this function, but said pin is especially provided to form a stop to limit the inward swinging motion of the hook.

The jaw 3 generally corresponds to the shape of the body 2. Its rear tapering end has a slot 21 which is occupied by the hook when in the set position (Fig. 2). For this purpose this slot opens at the rear terminal of the jaw. At its forward end the jaw has a V-notch 22 on the underside to swingably rest upon the knife edge 17, in which position it is held by a spring 23 below the head 24 of a screw 25 that is driven into the hole 18 through a counter-bore 26 in the head 27 of the jaw. The spring 23 and screw head 24 are housed in said counter-bore.

The V-notch 22 is divided into several matching notches (Fig. 3) by the hollow 28 on the underside of the jaw, which hollow is carried forwardly across the V-notch in two places in the interest of lightness. As far as function is concerned there is only a single V-notch and this turns upon the knife edge as already set out. The front surface 29 (Fig. 3) of the jaw head 27 is recessed at 30 to make room for the nut 12. The rim around the recess engages the abutment 6 and limits the turning of the jaw under the influence of the spring 23.

The hook to which repeated reference has been made, is generally designated 31. It includes the barb 32 and shank 33. The extremity of the shank is rigidly set in one end of a counter-weight 34. This weight is usually made of bronze, but it can consist of other desired metal and in making the hook-weight assemblage the hook shank is projected into the mold so that the weight is integrally formed onto the shank when the metal is cast.

The counter-weight is pivoted to the body 2 off-center by a pin 35. Since the tendency of the counter-weight is to turn clockwise (Fig. 2) it follows that the hook 31 tends to automatically assume the set position shown in full lines. A further function of the counter-weight is to keep the lure upright in the water. In this respect it acts like a weighted keel and it tends to prevent the lure from turning upside down. When the hook 31 is in the foregoing set position virtually the entire hook, especially the barb 32, is sheathed by the surrounding parts of the lure. Since the shank 33 engages the base of the slot 21, there is a tendency for the counter-weight 34 to aid the spring 23 in lifting the jaw 3 to the open position.

At this particular time a part of the tail portion of the counter-weight 34 lies projected beyond and below the bottom contour of the body 2 thereby providing a trigger which supplements the trigger function of the jaw 3. If the latter were stationary by any chance, for instance if it became stuck, the closing of the mouth of the fish upon the projecting counter-weight would impel the hook to the displaced and catching position, just as does the jaw 3 according to its normal function.

It is to be observed that the eye bolt 9 is situated off-center. That is to say, it is situated above the axial center of the lure. The upward pull on the line 36 upon the off-center eye bolt is of material aid to the counter-weight 34 in keeping the lure right side up. This line is attached at 37 to the swivel 10. The latter has an important coordination with a nose guard 38 which is made in the form of a bail. The bent ends 39 of this bail are set in alined holes in the head 7. The bail is made of spring wire, and the closing tension that it has keeps the bent ends pocketed in the holes. The bail is capable of turning on the bent ends and one of the important purposes of the arrangement is to have the bail occupy the open center of the swivel 10 so that as the latter is moved from side to side in compliance with the pull on the line 36, the bail is moved correspondingly and it then serves to push aside the seaweed or kelp 40.

The bail 38 does not interfere with the up and down motion of the swivel 10 because the central opening of the latter is long enough to accommodate the necessary motion. In addition to the positive thrust that the bail has upon the seaweed in lateral directions, it also serves to deflect the seaweed from above and below the lure. The head 7 is therefore prevented from becoming entangled in the seaweed and it becomes possible to troll through weed patches where the fish lie and where it is impossible to fish with other baits.

The operation is readily understood. The lure is capable of automatically setting itself because when left alone the expansion of the spring 23 rocks the jaw 3 clockwise on the knife edge 17 (Fig. 2), raising or opening the rear free end. The jaw is limited by the impact of its front surface 29 with the abutment 6. The hook 31 is made to swing on its pivot 35 by the gravitation of the counter-weight 34 until the hook takes the sheathed position shown in full lines in Fig. 2.

Now when a fish snaps the lure the jaw 3 closes in the direction of arrow $a$ so that the jaw assumes the dotted line position $b$. The sudden impact on the back of the hook throws the hook down and out in the direction of arrow $c$ to the dotted line position $d$. The counter-weight 34 moves up into the lure, the hollow 28 in the jaw 3 providing ample room. Inasmuch as the lure is supposed to be pulled forwardly (arrow $e$ Fig. 1) the now extended hook will catch the fish. If, by any chance, the fish should fail to grasp the lure but in having made the first attempt caused the extension of the hook to the dotted line position the fish will be caught on the second attempt because by that time both the jaw 3 and hook 31 will have automatically reset themselves to the full line positions.

It has been pointed out how the nose guard 38 deflects the weeds 40 from the approaching head of the lure. It is the natural wiggle of the lure, combined with the guard function of the bail 38 that bends the weeds clear of the lure. It is desired to point out that the lure is intended to be made in any one of a variety of sizes, depending on the kind of fish to be angled for. But in any case the foregoing principles are preserved.

I claim:

1. A fish lure comprising a hollow body, a hollow jaw, means by which the jaw is so mounted on the body as to turn, a hook which has means by which it is pivoted on the body, and means to simultaneously make the hook swing on its pivot so as to normally assume a sheathed position within the hollow body and to engage with a portion of the jaw to turn said jaw to an open position.

2. A fish lure comprising a hollow body, a hook and means by which it is pivotally attached to the body, and means connecting the hook to its pivot, said means having a portion projecting beyond the contour of the body when the hook is in a set and sheathed position in the lure and thereby susceptible to being impelled out of the lure when a fish displaces the projecting portion into the body.

3. A fish lure comprising a hollow body, a hollow jaw and means by which it is pivotally attached to the body, a hook and means by which it is also pivotally attached to the body, and a weight attached to the hook in such a way as to overbalance the hook and cause it to repeatedly move on its pivot to set and sheathed position in the lure, at the same time tending to move the jaw on its pivot to an open position, said weight further balancing the lure so that it will not turn over.

4. A fish lure comprising a hollow body, a hollow jaw and means by which it is pivotally attached to the body, a spring which so presses on a part of the jaw as to swing it on its pivot to an open position, a hook and means by which it is pivoted to the body, and a weight so attached to the hook that it will overbalance the hook on its pivot and move the hook into a sheathed position in the lure and into a set position against the jaw so that the hook will be impelled out of the lure every time the jaw is snapped shut.

5. A fish lure comprising a hollow body, a hook which includes a barb and a shank, a weight molded onto the extremity of the shank, a pin driven into the body through the weight close to the shank so as to pivotally support the hook, said weight overbalancing the hook so that the barb will move to a sheathed position within the body, said weight, further, keeping the lure right side up, a hollow jaw, and means by which it is pivoted on the body, and means tending to permanently turn the jaw on its pivot to an open position in which position the hook engages the jaw.

6. A fish lure comprising a hollow body which is cut out to provide an abutment, a knife edge fixed across the cut out, a weighted hook and means by which it is pivoted in the hollow body, a hollow jaw which has a V-notch that is set on the knife edge to form a pivot, a headed screw driven through a portion of the jaw into the body and having a spring bearing against the head and against said portion of the jaw to tend to permanently keep the jaw turned on its pivot in an open position, the amount of opening being limited by the engagement of a portion of the jaw with said abutment, said jaw having a slot then occupied by the hook in the set position.

7. A fish lure comprising a body, a hook, and means by which it is pivotally attached to the body, means by which a line is attached to one end of the body for pulling it through the water, and a guard having means by which it is pivotally connected to the body separately from the line attaching means and being loosely coupled to and swinging with said line attaching means as the line is pulled in different directions, said swinging of the guard bending weeds aside so as to prevent entanglement.

8. A fish lure comprising a body which has a head, a hook and means by which it is pivotally attached to the body, a swivel to which a line is connected and means by which the swivel is attached to the head, and a nose guard in the form of a bail going through the swivel and having means at its ends pivotally connecting it to the head so as to be able to swing.

9. A fish lure comprising a body which has a head, a hook and means by which it is pivotally attached to the body, an eye bolt set in the head, a swivel connected with the eye bolt and having provision for the connection of a line thereto, and a nose guard in the form of a bail which goes through the swivel, said bail being so curved that the swivel can move up and down with respect thereto, the ends of the bail being bent to set in alined holes in the head to enable lateral swinging.

10. A fish lure comprising a body which is hollowed, a cut-away to respectively define a center channel and an abutment and to leave a bridge piece, a knife edge on the bridge piece crosswise of the body, a jaw which has a V-notch set upon the knife edge to form a pivot, said jaw having a hole in front of the V-notch which hole is counter-bored, a headed element extending through the hole from the bridge piece so that the head occupies the counter-bore, a spring between said head and the floor of the counter-bore tending to swing the jaw on the knife edge so as to hold the jaw open, a portion of the jaw then engaging the abutment, a weighted hook, and means by which it is pivoted in the center channel, the weight tending to always turn the hook on its pivot so that it assumes a sheathed position in the body and in contact with the jaw, and means extending from side to side of the body to hold it together, one of said means serving as a stop for the hook.

ELWIN J. BABBITT.